US00RE49002E

(19) United States
(12) Reissued Patent
Salonen

(10) Patent Number: US RE49,002 E
(45) Date of Reissued Patent: Mar. 29, 2022

(54) METHOD AND SYSTEM FOR COMBINING TEXT AND VOICE MESSAGES IN A COMMUNICATIONS DIALOGUE

(71) Applicant: BOOKIT OY AJANVARAUSPALVELU, Helsinki (FI)

(72) Inventor: Jukka Kalevi Salonen, Luhtijoki (FI)

(73) Assignee: SMARTCOM LABS OY

(21) Appl. No.: 15/373,500

(22) Filed: Dec. 9, 2016

Related U.S. Patent Documents

Reissue of:
(64) Patent No.: 8,837,689
Issued: Sep. 16, 2014
Appl. No.: 14/042,854
Filed: Oct. 1, 2013

U.S. Applications:
(63) Continuation of application No. 14/519,606, filed on Oct. 21, 2014, now Pat. No. Re. 46,395, which is an
(Continued)

(30) Foreign Application Priority Data

May 2, 2006 (FI) ..... 20060419

(51) Int. Cl.
*H04M 11/00* (2006.01)
*H04W 4/12* (2009.01)
(Continued)

(52) U.S. Cl.
CPC ..... *H04W 4/12* (2013.01); *H04M 3/42382* (2013.01); *H04L 51/38* (2013.01)

(58) Field of Classification Search
CPC ..... H04M 1/64; H04W 4/12; H04W 3/42382; H04W 51/38
(Continued)

(56) References Cited

U.S. PATENT DOCUMENTS 5,592,666 A 1/1997 Perez
5,838,965 A 11/1998 Kavanagh et al.
(Continued)

FOREIGN PATENT DOCUMENTS

CN 1675637 A 9/2005
EP 0881802 A1 2/1998
(Continued)

OTHER PUBLICATIONS

Bmd wireless AG; Wirelss Application Messaging Serivce; Unknown 2004.

(Continued)

*Primary Examiner* — Ovidio Escalante
(74) *Attorney, Agent, or Firm* — Barnes & Thornburg LLP

(57) ABSTRACT

A method for delivering messages in a telecommunications network where the first text-form message of the session N is delivered to the user of the service such that the sender address (the A number) is converted to correspond to the session number N and the session stage J, in stages 2-n of the session N, a text-form message is received from the user of the message service at the sender address defined in the message in the previous stage, and the session proceeds according to the contents of the message such that the sender address (the A number) is converted to correspond to the session number N and the new session stage J, and the next text-form message of session N is sent to the user of the message service.

16 Claims, 4 Drawing Sheets

Related U.S. Application Data application for the reissue of Pat. No. 8,837,689, which is a continuation of application No. 13/548,255, filed on Jul. 13, 2012, now Pat. No. 8,576,993, which is a continuation of application No. 12/226,878, filed as application No. PCT/FI2007/050229 on Apr. 26, 2007, now Pat. No. 8,254,531.

(51) Int. Cl.
*H04M 3/42* (2006.01)
*H04L 51/58* (2022.01)

(58) Field of Classification Search
USPC ..... 379/88.13; 455/466
See application file for complete search history.

(56) References Cited

U.S. PATENT DOCUMENTS

| | | | | |
|---|---|---|---|---|
| 5,940,818 | A | 8/1999 | Malloy et al. | |
| 5,987,467 | A | 11/1999 | Ross et al. | |
| 6,003,036 | A | 12/1999 | Martin | |
| 6,085,100 | A | 7/2000 | Tarnanen | |
| 6,104,870 | A | 8/2000 | Frick et al. | |
| 6,199,076 | B1 | 3/2001 | Logan et al. | |
| 6,236,968 | B1 | 5/2001 | Kanevsky et al. | |
| 6,539,360 | B1 | 3/2003 | Kadaba | |
| 6,560,456 | B1 | 5/2003 | Lohtia et al. | |
| 6,564,261 | B1 | 5/2003 | Gudjonsson et al. | |
| 6,625,461 | B1 | 9/2003 | Bertacchi | |
| 6,639,919 | B2 | 10/2003 | Kroninger et al. | |
| 6,772,336 | B1 | 8/2004 | Dixon, Jr. | |
| 6,873,688 | B1 | 3/2005 | Aamio | |
| 6,990,332 | B2 | 1/2006 | Vihinen | |
| 7,149,537 | B1 | 12/2006 | Kupsh et al. | |
| 7,154,060 | B2 | 12/2006 | Rosenbaum et al. | |
| 7,222,081 | B1 | 5/2007 | Sone | |
| 7,406,429 | B2 * | 7/2008 | Salonen | 705/5 |
| 7,451,118 | B2 | 11/2008 | McMeen et al. | |
| 7,590,696 | B1 * | 9/2009 | Odell | G06Q 10/107 709/206 |
| 7,610,208 | B2 | 10/2009 | Salonen | |
| 7,610,224 | B2 | 10/2009 | Spiegel | |
| 7,619,584 | B2 | 11/2009 | Wolf | |
| 7,660,397 | B2 | 2/2010 | Heen et al. | |
| 7,844,674 | B2 | 11/2010 | Madams et al. | |
| 7,996,023 | B2 | 8/2011 | McGary et al. | |
| 8,050,664 | B2 | 11/2011 | Salonen | |
| 8,145,245 | B2 | 3/2012 | Aulu | |
| 8,359,242 | B2 | 1/2013 | Guillot | |
| 2001/0037264 | A1 | 11/2001 | Husemann et al. | |
| 2001/0049785 | A1 | 12/2001 | Kawan et al. | |
| 2002/0028686 | A1 | 3/2002 | Kagi | |
| 2002/0032589 | A1 | 3/2002 | Shah | |
| 2002/0059146 | A1 | 5/2002 | Keech | |
| 2002/0080822 | A1 | 6/2002 | Brown et al. | |
| 2002/0104007 | A1 | 8/2002 | Moodie et al. | |
| 2002/0111914 | A1 | 8/2002 | Terada et al. | |
| 2002/0128908 | A1 | 9/2002 | Levin et al. | |
| 2002/0165000 | A1 | 11/2002 | Fok | |
| 2002/0173319 | A1 | 11/2002 | Fostick | |
| 2002/0180696 | A1 | 12/2002 | Maritzen et al. | |
| 2002/0184509 | A1 | 12/2002 | Scheidt et al. | |
| 2002/0188562 | A1 | 12/2002 | Igarashi et al. | |
| 2002/0191795 | A1 | 12/2002 | Wills | |
| 2003/0005126 | A1 | 1/2003 | Schwartz et al. | |
| 2003/0101071 | A1 | 5/2003 | Salonen | |
| 2003/0163536 | A1 | 8/2003 | Pettine, Jr. | |
| 2003/0211844 | A1 | 11/2003 | Omori | |
| 2004/0097247 | A1 | 5/2004 | Vilkuna et al. | |
| 2004/0128158 | A1 | 7/2004 | Salonen | |
| 2004/0128173 | A1 | 7/2004 | Salonen | |
| 2004/0139318 | A1 | 7/2004 | Fiala et al. | |
| 2004/0157628 | A1 | 8/2004 | Daniel et al. | |
| 2004/0185883 | A1 | 9/2004 | Rukman | |
| 2004/0198322 | A1 | 10/2004 | Mercer | |
| 2005/0027608 | A1 | 2/2005 | Wiesmuller et al. | |
| 2005/0044042 | A1 | 2/2005 | Mendiola et al. | |
| 2005/0054286 | A1 | 3/2005 | Kanjilal | |
| 2005/0065995 | A1 | 3/2005 | Millstein et al. | |
| 2005/0102230 | A1 | 5/2005 | Haidar | |
| 2005/0171738 | A1 | 8/2005 | Kadaba | |
| 2005/0246209 | A1 | 11/2005 | Salonen | |
| 2005/0268107 | A1 | 12/2005 | Harris et al. | |
| 2006/0010085 | A1 | 1/2006 | McMeen et al. | |
| 2006/0040682 | A1 | 2/2006 | Goertz et al. | |
| 2006/0075139 | A1 | 4/2006 | Jungck | |
| 2006/0131385 | A1 | 6/2006 | Kim | |
| 2006/0168064 | A1 | 7/2006 | Huynh et al. | |
| 2006/0224407 | A1 | 10/2006 | Mills | |
| 2006/0271551 | A1 | 11/2006 | Suojasto | |
| 2007/0010266 | A1 | 1/2007 | Chaudhuri | |
| 2007/0047533 | A1 | 3/2007 | Criddle et al. | |
| 2007/0105536 | A1 | 5/2007 | Tingo, Jr. | |
| 2007/0123246 | A1 | 5/2007 | Daniel et al. | |
| 2007/0135101 | A1 | 6/2007 | Ramati et al. | |
| 2007/0143230 | A1 | 6/2007 | Narainsamy et al. | |
| 2007/0239578 | A1 | 10/2007 | Klemens | |
| 2007/0288215 | A1 | 12/2007 | Goldman | |
| 2008/0147408 | A1 | 6/2008 | Da Palma et al. | |
| 2008/0256191 | A1 | 10/2008 | Murphy et al. | |
| 2008/0285475 | A1 | 11/2008 | Menditto | |
| 2008/0317224 | A1 | 12/2008 | Salonen | |
| 2009/0104925 | A1 | 4/2009 | Aula | |
| 2009/0175422 | A1 | 7/2009 | Marics et al. | |
| 2009/0264100 | A1 | 10/2009 | Sapir et al. | |
| 2009/0281929 | A1 | 11/2009 | Boitet et al. | |
| 2010/0030689 | A1 | 2/2010 | Ramos et al. | |

FOREIGN PATENT DOCUMENTS

| | | | |
|---|---|---|---|
| EP | 0967754 | A2 | 12/1999 |
| EP | 1065899 | A1 | 3/2001 |
| EP | 1546938 | A | 8/2002 |
| EP | 1458201 | A1 | 9/2004 |
| EP | 1546938 | A1 | 6/2005 |
| FI | 20011680 | | 2/2003 |
| FI | 20011680 | A | 2/2003 |
| FI | 000117663 | B | 12/2006 |
| FI | 000117663 | B1 | 12/2006 |
| FI | 20060387 | | 10/2007 |
| FI | 20060387 | A | 10/2007 |
| FI | 000118586 | B | 12/2007 |
| GB | 2391646 | A | 11/2004 |
| GB | 2435565 | A | 8/2007 |
| KR | 20040013261 | A | 2/2004 |
| WO | 9706603 | A2 | 2/1997 |
| WO | 0041102 | A2 | 7/2000 |
| WO | 0052601 | A1 | 9/2000 |
| WO | 2001013299 | A2 | 2/2001 |
| WO | 0139033 | A1 | 5/2001 |
| WO | 0153991 | A1 | 7/2001 |
| WO | 2002067602 | A1 | 8/2002 |
| WO | 2004019223 | A1 | 3/2004 |
| WO | 2006122399 | A1 | 11/2006 |
| WO | 2007063179 | A1 | 6/2007 |
| WO | 2007122292 | A1 | 11/2007 |
| WO | 2007125171 | A1 | 11/2007 |
| WO | 2008017695 | A2 | 2/2008 |
| WO | 2010000949 | A1 | 1/2010 |

OTHER PUBLICATIONS

Finnish Search Report; dated May 4, 2006.
Finnish Search Report; dated Jun. 3, 2009.
Content Gateway, Version 4.0; Development and Billing Manual; Jan. 1, 2005, Telia Sonera Finland Oy; www.sonera.fi/files/sonera.fi/.
Elisa Plc's Press Release; BookIT Ltd. and Elisa Implement a Handy Mobile Phone-Enabled Check-In Service for Finnair; Jun. 9, 2004; www.elisa.fi.
Elisa Plc's Press Release; Innovative Solution Receives 2004 European Good Practice Award in Occupational Health and Safety and the appendix BookIT case.pdf; Nov. 22, 2004.

(56) References Cited

OTHER PUBLICATIONS

Empower Interactive Group Ltd.; Virtual Mobile Redirector—Product Information Document; Unknown 2001.
Finnair Plc's Press Release; Finnair to Introduce the World's Easiest Check-In with a Text Message; Jun. 9, 2004; www.bookit.net/news.
Kauppalehti; Mobiilipalvelujen Oltava Yksinkertaisia; BookIT:n Jukka Salonen uskoo tavallisiin tekstiviesteihin; Heikki Nenonen; Jun. 9, 2005; p. 19.
Mobileway; Mobileway Launches its Mobile Transaction Tracker Solution—An Interactive Platform to Authenticate Macropayment Made by Mobile Consumers; Jul. 2002; pp. 1-2; United States.
Mouly et al.; The GSM System for Mobile Communications; Unknown 1992; pp. 556-560; Palaiseau.
Penttinen; GSM-tekniikka; WSOY; Unknown 1999; pp. 155-157, 222, and 331-332; Porvoo.
Verkkouutiset; Sonera Tarjoaa Matkaviestinoperaattoreille Content Gateway—Palvelualustaa; Feb. 21, 2001; www.verkkouutiset.fi.

* cited by examiner

START OF SERVICE:
- SEND FIRST TEXT-FORM MESSAGE OF SESSION N TO USER OF SERVICE, IN SUCH A WAY THAT
o SENDER ADDRESS (E.G., A NUMBER) IS CONVERTED TO CORRESPOND TO THE SESSION NUMBER N AND THE SESSION STAGE J.
- AT LEAST ONE SELECTION QUERY IN MESSAGE

43

- RECEIVE, AT THE SENDER ADDRESS DEFINED IN THE MESSAGE IN THE PREVIOUS STAGE, A TEXT-FORM MESSAGE FROM USER OF SERVICE, AND PROCEED ACCORDING TO THE CONTENT OF THE MESSAGE

- SEND THE NEXT TEXT-FORM MESSAGE OF SESSION N TO THE USER OF THE MESSAGE SERVICE, IN SUCH A WAY THAT
o THE SENDER ADDRESS (E.G., THE A-NUMBER) IS CONVERTED TO CORRESPOND TO THE SESSION NUMBER N AND THE NEW SESSION STAGE.

41

RECEIVE, AT THE SENDER ADDRESS DEFINED IN THE MESSAGE IN THE PREVIOUS STAGE, *OR AT THE ADDRESS CONTAINED IN THE MESSAGE* A VOICE MESSAGE FROM THE USER OF THE SERVICE, AND PROCEED ACCORDING TO THE CONTENT OF THE MESSAGE.

- SEND, IF NECESSARY, THE NEXT TEXT-FORM MESSAGE OF SESSION N TO THE USER OF THE MESSAGE SERVICE, IN SUCH A WAY THAT
o THE SENDER ADDRESS (E.G., THE A-NUMBER) IS CONVERTED TO CORRESPOND TO THE SESSION NUMBER N AND THE NEW SESSION STAGE J.

42

Fig. 4

METHOD AND SYSTEM FOR COMBINING TEXT AND VOICE MESSAGES IN A COMMUNICATIONS DIALOGUE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This patent application is a *continuation reissue application of co-pending U.S. patent application Ser. No. 14/519,606, filed 21 Oct. 2014, which is a reissue of U.S. patent application Ser. No. 14/042,854, filed 1 Oct. 2013, now U.S. Pat. No. 8,837,689, which is a* continuation of U.S. patent application Ser. No. 13/548,255, filed 13 Jul. 2012, *now U.S. Pat. No. 8,576,993,* which is a continuation of U.S. patent application Ser. No. 12/226,878, filed 2 Feb. 2009, now U.S. Pat. No. 8,254,531, which is a National Phase of International Patent Application No. PCT/FI2007/050229, filed 26 Apr. 2007, which claims priority to Finnish Patent Application No. 20060419, filed 2 May 2006, the disclosures of which are incorporated herein by reference in their entirety. *U.S. patent application Ser. No. 14/519,606 and the instant application are reissue and continuation reissue applications, respectively, of U.S. Pat. No. 8,837,689.*

FIELD OF THE INVENTION

The present invention relates to a system and a method for combining text and voice messages in a communications dialogue.

Methods and systems of this kind are used, for example, for implementing text-message based booking services.

BACKGROUND OF THE INVENTION

According to the prior art, message dialogues are implemented purely on a text-message basis. A message dialogue may break, if it has been wished to make contact in the dialogue with the aid of a voice message, such as a voice call. The dialogue has had no support for voice messages, instead the voice message has remained an event external to the dialogue.

In addition, according to the prior art, bulk deliveries of e-mail messages have been implemented from a number inside operators' networks using Content Gateway technology. The delivery address of the Content Gateway bulk-delivery technology on the network side is not a familiar telephone number, which has the form +358 400 123 456, but is a short service number, which is not a real telephone number, but instead, for example 16400. Because it is not a real network number, it also cannot roam from one network to another, but goes directly to the content gateway of the operator in question. In the present document, the term roaming refers to either the updating of number information when a terminal device moves from one country to another, or the functionality of a service number when the service is used from a different country to that in which the service provider is located. Operators have constructed varied and complex solutions, by means of which services can be made to function also in other operators' networks and number spaces. In practice, this leads to complicated mutual agreements on the joint use of specific numbers, for example, by routing messages coming to the specific number of another operator back to the operator owning the number.

For years, attempts have been made to harmonize numbers on a European level, but the competing operators have never reached agreement on general service numbers. A additional drawback of the present technology is that, in the solution, the connection equipment inside the network of one operator should be connected with the corresponding connection equipment of all the other operators of networks (point to point). This creates a large number of agreements and connections from one place to another. Therefore in practice such solutions only function between a few operators.

The message bulk-delivery systems according to the prior art are thus implemented on a telephone-operator-specific basis, in such a way that the 'sender' field of the messages has shown the operator's own number, which as described above is not a roaming number. The services have therefore not functioned outside the own country. Such a system is not suitable for query dialogues of a demanding type, as the use of the 'reply function' has always returned the messages to the same number and then only if the subscriber has been in their home network.

Attempts have also been made to solve the problem using tailor-made modem banks, but these solutions have been slow, expensive, and even unreliable.

SUMMARY OF THE INVENTION

The invention is intended to eliminate the defects of the prior art disclosed above and for this purpose create an entirely new type of method for combining text and voice messages in a communications dialogue.

One preferred embodiment of the invention concerns applying the aforementioned method to the bulk delivery of messages, and providing the invention for international use.

The invention is based on receiving, in the message dialogue, a voice message (voice-call or VOIP connection), from the user of the message service, at the message's sender address defined in the previous stage of the dialogue, or at an address contained in the message, and proceeding according to the contents of the message. If necessary, the session's next text-form message is sent to the user of the message service, in such a way that the sender address (e.g., the A number) is altered to correspond to the session number and new session stage.

According to a preferred embodiment of the invention, the desired reply address of each bulk-delivery message, typically the sender information, is altered to correspond to a predefined dialogue, in which the stage of the dialogue defines unequivocally the sender information, in which case the sending and reception of messages is implemented in different parts of the telecommunications network.

Considerable advantages are gained with the aid of the invention.

The voice-message possibility according to the invention creates flexibility in the dialogue, but does not, however, break the flow of the logic of the dialogue. Flexibility can be implemented in a very user-friendly manner, in which case text-form messages are used to route the sound-message queries to precisely the correct and free recipient, at its best in such a way that the respondent will know both the caller and his dialogue, and even the stage of the dialogue, so that unnecessary connections that waste the user's time will be avoided, and also the capacity of the messaging network will be saved.

Preferred embodiments of the invention are operator independent and function in the networks of all operators. The most typical applications of the invention function in any gsm-customer's telephone in any network. The invention provides a cost advantage on the sending side due to bulk sendings and, nonetheless, the reception functions completely country independent, that is completely roaming in respective operator's network.

In the following, the invention is examined with the aid of examples and with reference to the accompanying drawings.

BRIEF DESCRIPTION OF THE DRAWINGS

FIG. 4 shows a flow diagram of a solution according to the invention.

DETAILED DESCRIPTION OF EXEMPLARY EMBODIMENTS

Figure 1:
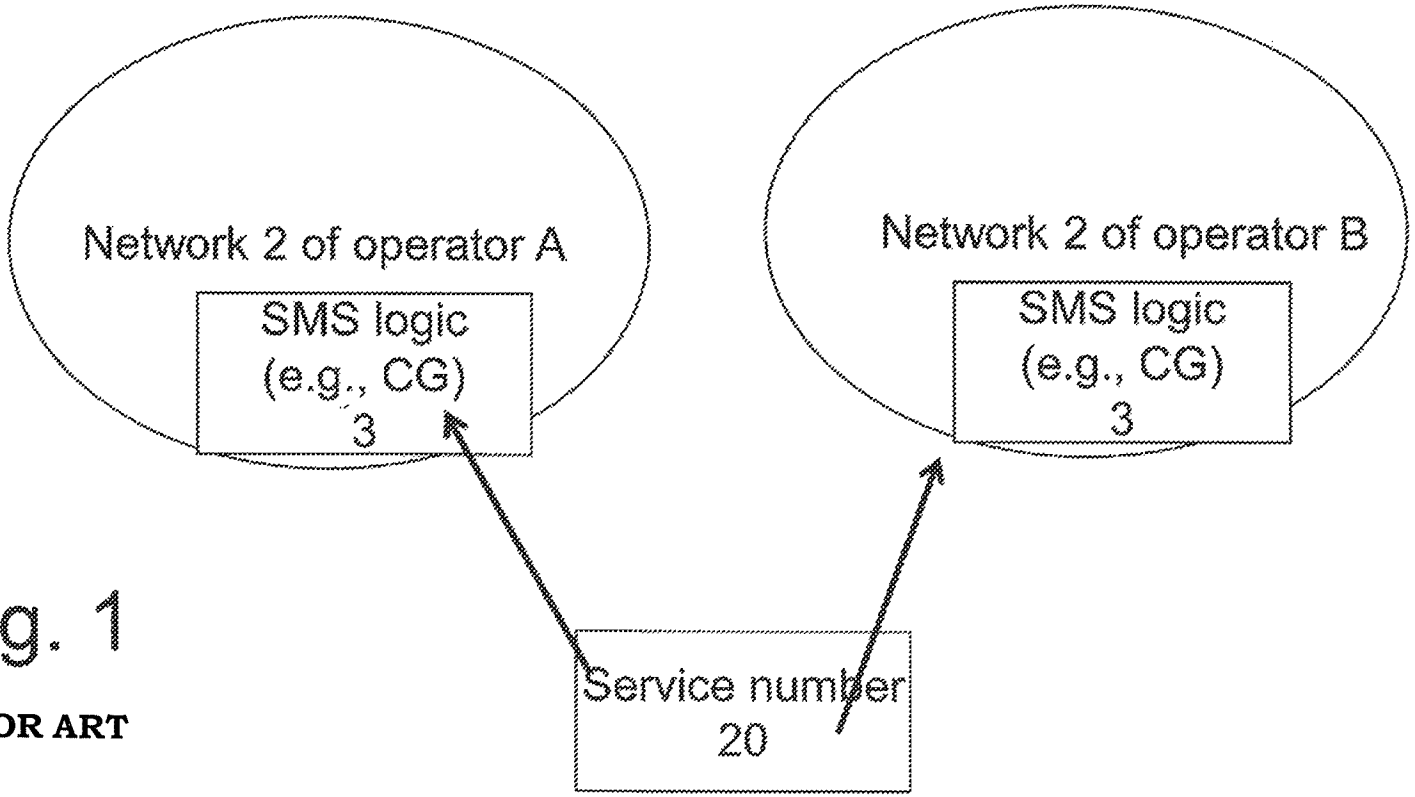
Fig. 1 PRIOR ART
FIG. 1 shows schematically a solution according to the prior art.

In FIG. 1, according to the prior art, telephone operators A and B have text-message bulk-delivery means 3 in their own networks, by means of which each operator can effectively deliver large numbers of text messages. In the solution shown, each operator has a service number 20 relating to the joint message service arranged agreement and connection technically, which is not available to operators outside the agreement. According to the prior art, the service number 20 is a non-roaming short number.

Figure 2:
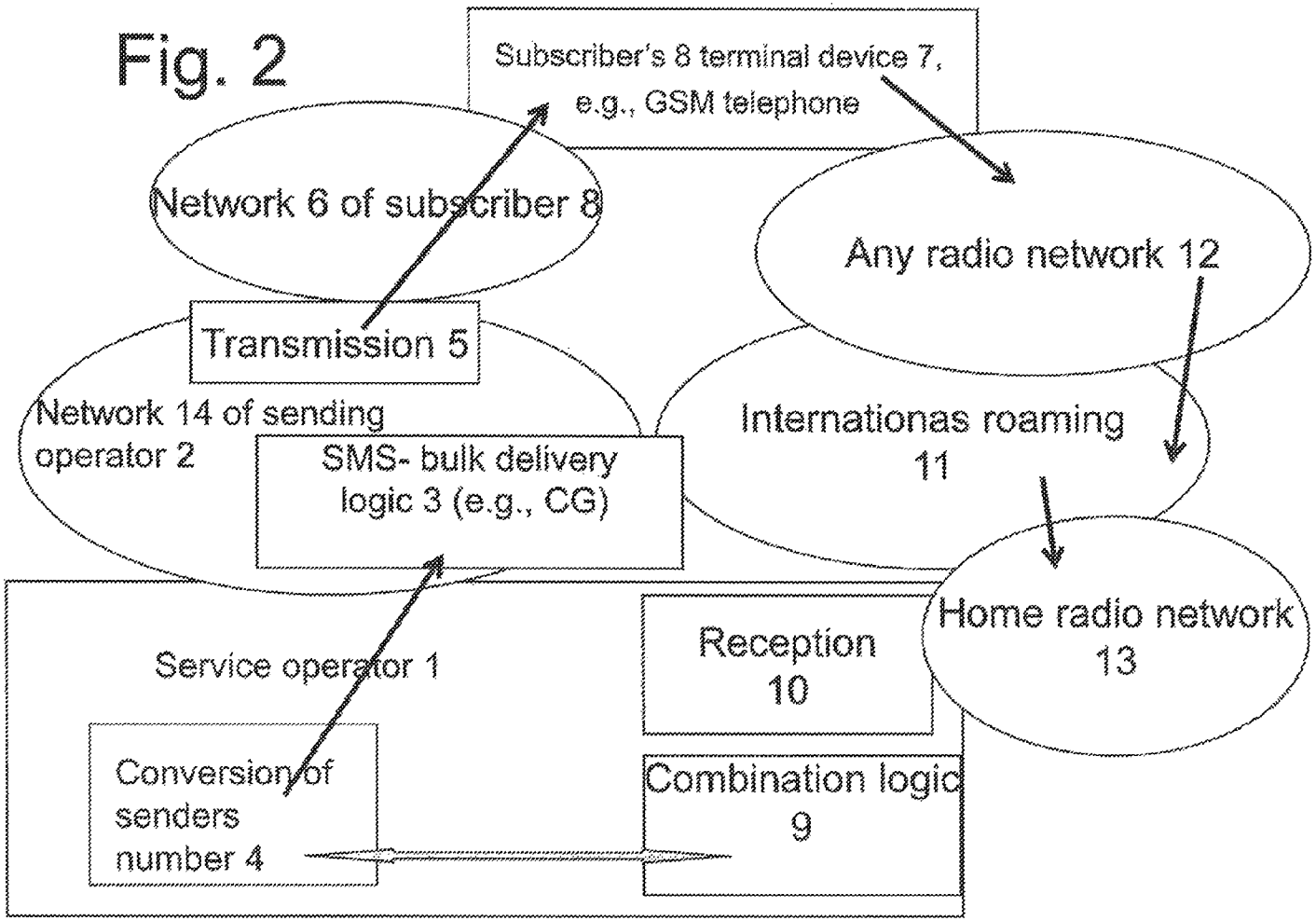
FIG. 2 shows a block diagram of a solution according to a preferred embodiment of the invention.

In the system according to FIG. 2, there are typically two parties, which in exceptional cases can be the same company.

The service providing service company or association 1, which provides subscribers 8, for example, with booking services for buying tickets, changing tires, etc. The service company or association 1 operates in a radio network, the home network 13 of some operator.

In the present application, the term service company or association 1 refers to an association or company, which operates in either its own or an extraneous telecommunications network, and produces either directly or indirectly services for customers. Such a company or association is typically a sub-contractor of an actual telephone operator, nor does a user of the service necessarily even know of the existence of the service company or association 1. In a preferred embodiment of the invention, the service company or association produces either directly or indirectly many kinds of booking and reservation services for telephone subscribers. The invention can also be used within a single association.

The system also includes a telephone operator 2, in the network 14 of which there are means and equipment for the bulk delivery of digital messages containing sender information (such as SMS messages). Such a practical network clement is, for example, SMS-bulk-delivery logic 3, which can be implemented, for example, using Content Gateway technology.

Figure 3:
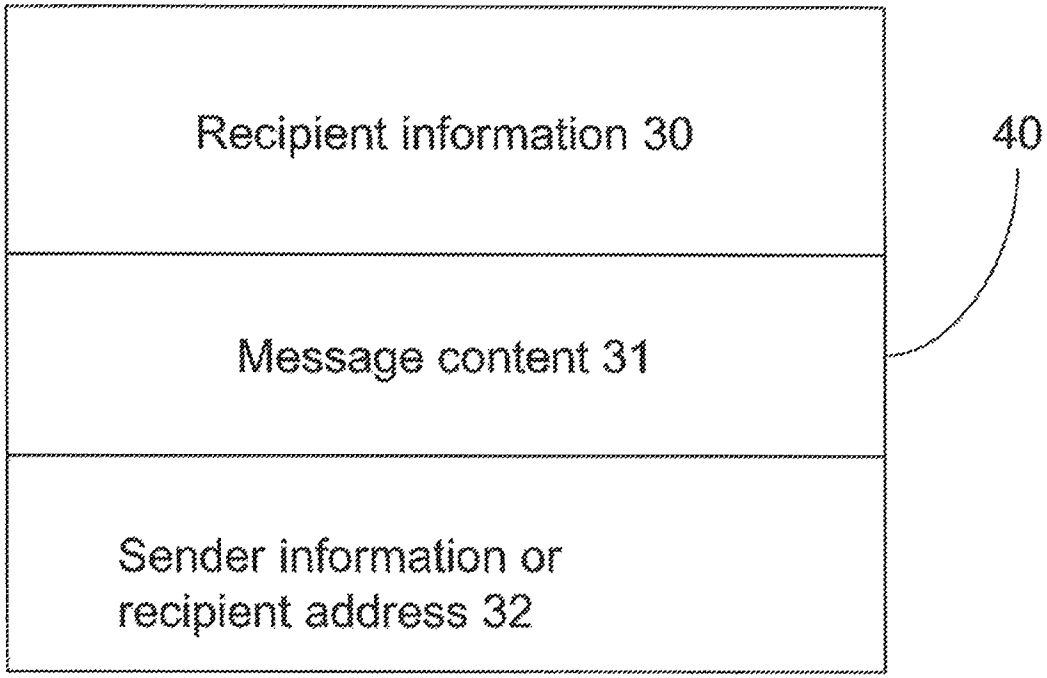
FIG. 3 shows schematically information fields in a message according to the invention.

With reference to FIGS. 2 and 3, in the first service stage the service company or association 1 uses combination logic 9 and number conversion 4 to form a large number of messages 40, each of which contains recipient information 30, the actual message 31, and information 32 of either the sender or in practice the address, to which a reply to the message 40 is desired. In an SMS (Short Message System) application, the recipient information 30 is a mobile-station number and the sender information 32 is the sender information in the sender field 32 of the SMS message altered using a number converter 4.

Within the scope of the invention, the message 40 can be any message whatever that can be sent through a digital information network, which comprises recipient information, the actual message, and information on the desired reply address, for example, in the form of sender information. Such message 40 can be besides SMS messages, for instance, e-mail messages, or, for example, multimedia messages (MMS).

A large number of the aforementioned messages can be formed dynamically on the basis of complex dialogues. Corresponding, for example, in emergency applications, the message totality can be static and ready for an emergency situation.

In the conversion of the desired reply address, for example of the sender's number, it is possible to take into account the address (or number) from which the connection to the service company or association 1 has been formed. In this way, it is possible to route the messages of subscribers 8 in the USA to their own national server, and correspondingly the messages of Finnish users of the same service to their own national server. From these national servers, the reply messages can be transferred over suitable telecommunications links to the service company or association 1 for further measures.

The messages formed by the service company or association 1 are sent to the bulk-delivery logic 3, which is located in the operator's 2 network 14, from where the bulk delivery 5 of the messages is implemented. From here the messages 40 disperse always according to the recipient information 30 and arrive at the subscriber's 8 terminal 7 through the subscriber's 8 radio network 6 at the time. The subscriber 8 can reply to the message using the 'reply' function, in which case the reply message is sent to the address that is defined by the value of the sender or reply-address field 32. The message 40 leaves to the service company or association 1 through radio networks 12, 11, and 13. Naturally, if the subscriber 8 is within the area of the home network 13 of the service company or association 1, the message will not travel through the networks 11 and 12. From the home network 13, the message is transferred to the reception 10 of messages for the service company or association, where it is combined with a suitable dialogue with the aid of combination logic 9 and number conversion. In practice, networks 13 and 14 may be the same thing.

More concretely, for example, in an SMS application, when a message is sent to the subscriber 8, the sender's number (A number) is converted before bulk delivery in block 4, for example, to +358500001 in the first stage of a predefined session (dialogue). The number space of the sender's number (A number) is defined by the service provider's 1 own number space, which in the invention is entirely independent of the number space of the sending operator 2. In the following stage of the same session, the A number is, for example, +358500002, guided by the logic 9 of the service company or association 1, and so on. The sending A number is tightly defined from a logically progressing dialogue formed by the service provider 1, in which the reply to each message sent is awaited at a specific telephone number (digital reply address), which is contained in the message sent as the A number.

Thus, the subscriber replies to the SMS message using the reply function, so that in the first stage of the dialogue the reply goes to the number +35800001 and correspondingly in the second stage of the dialogue to the number +3580002. Example of Dialogue:

| Message | Sender's number |
|---|---|
| 1. Do you need to book a time for tire changing, reply Y/N | +35850001 |
| 2. Is 07.12.2005 suitable, reply Y/N | +35850002 |

With the reply 'Y' of the subscriber 8 the system of the service provider sends a message 2. The dialogue terminates, if the reply to the first message is 'N'. In stage 2, the reply 'Y' leads to the time being booked, whereas the reply 'N' leads to a new booking proposal.

According to the invention, the system can route a message to the subscriber (user) 8, in the content of which there is a telephone number ready for a voice message. This information can also be converted as the sender information of the message, i.e. the converted A number. Thus either of the numbers is selected in such a way that when the subscriber (user) 8 makes a voice-message call (voice call or VOIP connection) to this number, the system sends to the recipient of the call the information on the sender, for example, on basis of the A number, and in addition also of the information relating to the stage of the dialogue, in which case the person replying to the voice message will know not only the identity of the subscriber (user) 8, but also what the call concerns and the dialogue will continue logically.

The messages described above are, thus, sent as a bulk delivery to hundreds/thousands of recipients at one time and the A number (=field 32) of the first stage of the dialogue would then always be +35850001 and correspondingly in the second stage of the dialogue always +35850002, so that the reply to each message sent will always be targeted to the right number. In connection with the reply, the A number of the sender 8 is, in turn, defined by the person for whom the booking is made.

According to FIG. 4, the method according to the invention is implemented as follows:

The long, logically continuous, temporally discontinuous session N is implemented as follows. The session N is divided in to sub-stages J (43, 41, 42), which are typically temporally separated from each other. The actual session N is, however, logically continuous, in other words the queries and replies proceed logically for the entire duration of the session.

The service relating to the session N is started in block 43. The first text-form message of session N is then sent to the user of the service, in such a way that the sender address (e.g. the A number) is converted to correspond to the session number N and the session stage J.

In block 42, the stages 2-n of the session N are depicted, in which a text-form message is received, from the user of the message service, at the sender address defined in the message in the previous stage, and the session then proceeds according to the content of the message, in such a way that the sender address (e.g. A number) is converted to correspond to the session number N and the new session stage J. Next, the following text-form message of the session N is sent to the user of the message service.

According to block 42, an additional stage according to the invention is implemented in such stage of the process, in which a voice message (voice call or VOIP connection) is received, from the user of the message service, at the sender address of the message defined in the message in the previous stage, or at an address contained in the message, and the session then proceeds according to the contents of the message, as either a new voice message (voice call or VOIP connection), or as a text message. Several consecutive voice messages (voice call or VOIP connection) belonging to the session N can also be controlled according to the invention, according to a logically continuous, temporally discontinuous session N.

After this, if necessary the following text-form message of session N is sent to the user of the message service, in such a way that the sender address (e.g. A number) is converted to correspond to the session number N and the new session stage J.

According to the invention, a preferred embodiment is an SMS message, but according to the invention the message can be some other digital short message, in which it is possible to reply to the message, without separately defining the recipient. Thus the sender or reply-address field (field 32 in FIG. 3) can contain, instead of telephone-number information, the desired reply address in some other form, for example, as an e-mail address, or as numeric or alphanumeric sender or reply-address information.

Thanks to the number conversion, the message is typically received in an open radio network external to the network of the operator 2, which sent the message, and is routed on the basis of the A number to the system of the service company or association 1.

Thus, in the invention, in an SMS application, before bulk delivery the information of the 'sender' field of the text message is changed, in such a way that a different value is written in it to what the sender's number is in reality. This value is obtained from the logic 9, 10 of the service company or association 1, according to a predefined rule, in such a way that the queries and replies arriving in the logic can be combined.

In addition, in the system of the service company or association 1 there is logic 9 connecting the sending end and the receiving end, which can combine a sent message and its return message arriving from an extraneous operator 2, in such a way that the subscriber can reply (from outside the network) from any subscription whatever, but, however, the sending can take place from inside the network using a large capacity and economically. I.e. it is possible to select the cheapest sending operator, but receive from anywhere in the information network.

According to the invention, at the receiving end of the messages it is possible to disperse reception, in such a way that, for example, in Sweden reception takes place in a local network element and in Finland correspondingly in a Finnish network element, from which national network elements the received messages are transferred using suitable connections, for example, an TP link, to the system of the service company or association, for further processing. Thus the international roaming of the service is faster and cheaper, as well as more reliable. In addition, the use of the service is more pleasant for the consumer, because sending takes place to the number of a local operator, and not to the network of a foreign operator, which is considered to be expensive. In some subscriptions, a foreign message is even blocked, i.e., may not function without the service according to the invention.

One application of the invention is described in the following:

There are thousands of experts, who are needed in various catastrophe or emergency situations, or in other unexpected situations, where there is an acute need to have a large number of experts acting simultaneously. Often the situation is such that personnel is required in several locations simultaneously, in which case the emergency control room will send messages concerning several locations. The personnel required then receives the message, using the system according to the invention, in their telephones and each recipient replies to the message that seems most appropriate. Thus the emergency control room can decide on the basis of the replies who to send to which operation and in which area.

For example, after an earthquake an emergency control center sends messages to thousands of emergency-aid specialists, using bulk-delivery logic, stating that help and expertise are required in Area 1, Area 2, and Area 3. When an emergency-aid specialist receives these three messages through his own operator, he can reply to the message that is the best alternative for him. The reply from the expert leaves through a radio network to the number defined by the message as an individual message through the service company or association 1 to the emergency control center. Once the replies have been received, the server of the service provider 1 can combine the information on which expert is going to which of the areas 1-3. Thus the emergency control center can act immediately and get the necessary personnel and equipment rapidly to their destinations.

In the above application, it is also possible to the user of the subscription to be given a possibility to use a voice message according to the invention.

One application according to the invention is also the creation of a link to a person who travels globally in the service of an international major corporation. Large corporations typically have their own message communications centers, responding to the messages sent by which is difficult using existing technology, because if, for example, an American receives a group message from his company when he is in India, the 'reply' function cannot be used to reply to the message, because using existing technology there is a non-international number in the sender field. According to the invention, problems relating to both international roaming and also the further processing of the reply to the message are solved.

If, according to what is stated above, a person who is a subscriber wishes to reply only to telephone numbers with the code of his own country, the service provider can send from its own country group messages as a mass sending, in which the number of the sender is converted to an internal number of the recipient's country and the recipients can reply in their own area, without international numbers. In that case, the service provider will require servers in the country in question. Reply messages from the country-specific server are transmitted, for instance, over an IP connection to a server in the service provider's country, in which there is combination logic.

In the above application, it is also possible to the user of the subscription to be offered an opportunity to use a voice message according to the invention.

In the invention, a number external to the network is thus converted into the sender's identifier (=the desired reply address), so that it must return through the radio interface of the network. Thus in the reply situation the message is not routed directly to a service number inside the network, but instead through a radio interface outside the network, so that it roams automatically. For this operation, in one preferred embodiment of the invention there is thus not the short number 16400, but instead the fully roaming international number +358 5016400.

According to the invention, for example, a thousand messages are sent at one time using a bulk-sending application 3, in such a way that each individual message is given converted sender information for the reply message, so that the return messages arrive at different times (as people gradually reply) through several radio modems, so that the momentary capacity required for each radio modem will be small. However, the operation of services outside the service provider's home country, i.e. roaming operation, is achieved with the aid of the invention.

In this application, the term sender information refers to both a telephone number (A number) and to any information whatever, transported with a message, concerning the desired return address.

The method and system according to the invention are implemented, with the aid of at least one computer, in a telecommunications network.

The preferred application environment of the solution according to the invention is disclosed in publication WO 2004/019223, Booking System, messages sent by the system applied to which can be implemented using the mass-sending method according to the present invention.

The invention claimed is:

[1. A method, comprising:

sending, in a telecommunications network to a mobile terminal of a user of a message service, a text-form message, wherein the text-form message relates to a session and a current stage of the session, wherein the sending comprises altering a sender address of the text-form message based on the current stage of the session; and receiving, at the altered sender address or at an address contained in the sent text-form message, a reply message from the mobile terminal, wherein the session proceeds based on contents of the reply message;

wherein in at least one stage of the session the reply message contains or relates to a voice message and the session proceeds based on contents of the voice message.]

[2. The method of claim 1, further comprising repeating the sending and receiving steps for at least one subsequent current stage, wherein said repeating comprises altering the sender address of the text-form message based on at least one subsequent current stage and sending the text-form message with the altered sender address.]

[3. The method of claim 1, further comprising authenticating the mobile terminal based on said receiving the reply message at the altered sender address or at an address contained in the sent text-form message.]

[4. The method of claim 1, wherein the text-form message comprises a Short Message Service ["SMS"] message.]

[5. The method of claim 1, wherein the text-form message comprises a Multimedia Message Service ["MMS"] message.]

[6. The method of claim 1, wherein the text-form message comprises an e-mail message.]

[7. The method of claim 1, wherein each of the sender addresses comprises an Internet Protocol Address.]

[8. The method of claim 1, wherein said altering the sender address of the text-form message comprises altering the sender address to an address operative in the mobile terminal's home network or country.]

[9. A telecommunication apparatus, wherein the telecommunication apparatus is configured to:

send, in a telecommunications network to a mobile terminal of a user of a message service, a text-form message, wherein the text-form message relates to a session and a current stage of the session, wherein the sending comprises altering a sender address of the text-form message based on the current stage of the session; and receive, at the altered sender address or at an address contained in the sent text-form message, a reply message from the mobile terminal, wherein the session proceeds based on contents of the reply message;

wherein at least one of the reply messages is a service order message, which is associated with at least one order for a supplementary service, which is subject to payment, wherein the telecommunication apparatus is further configured to initiate delivery of the supplementary service over a communications channel which is not used to send or receive the text-form messages.]

[10. The telecommunication apparatus of claim 9, further comprising means for repeating the sending and receiving for at least one subsequent current stage, wherein said repeating comprises altering the sender address of the text-form message based on at least one subsequent current stage and sending the text-form message with the altered sender address.]

[11. The telecommunication apparatus of claim 9, wherein the telecommunication apparatus is further configured to authenticate the mobile terminal based on said receiving the reply message at the altered sender address or at an address contained in the sent text-form message.]

[12. The telecommunication apparatus of claim 9, wherein the text-form message comprises a Short Message Service ["SMS"] message.]

[13. The telecommunication apparatus of claim 9, wherein the text-form message comprises a Multimedia Message Service ["MMS"] message.]

[14. The telecommunication apparatus of claim 9, wherein the text-form message comprises an e-mail message.]

[15. The telecommunication apparatus of claim 9, wherein said sending means are configured to alter the sender address of the text-form message to an address operative in the mobile terminal's home network or country.]

[16. The telecommunication apparatus of claim 9, wherein each of the sender addresses comprises an Internet Protocol Address.]

[17. The telecommunication apparatus of claim 9, wherein the telecommunication apparatus comprises an SMS bulk-delivery system.]

[18. A telecommunication apparatus, comprising:

a data processor for executing logic instructions;

a set of interfaces to at least one network supporting mobile terminals;

a message sending logic for sending at least one message to at least one of the mobile terminals;

a reply message reception logic for receiving at least one reply message to said at least one of the mobile terminals; and a sending address converter for converting a sender address in the at least one message to at least one of the mobile terminals;

wherein the telecommunication apparatus further comprises a set of logic instructions whose execution on the data processor causes the data processor to perform the following acts:

sending, in the telecommunications network to a mobile terminal of a user of a message service, a text-form message, wherein the text-form message relates to a session and a current stage of the session, wherein the sending comprises altering a sender address of the text-form message based on the current stage of the session; and receiving, at the altered sender address or at an address contained in the sent text-form message, a reply message from the mobile terminal, wherein the session proceeds based on contents of the reply message;

wherein in at least one stage of the session the reply message contains or relates to a voice message and the session proceeds based on contents of the voice message.]

[19. A tangible and non-transitory program carrier, comprising:

logic instructions executable on a data processing apparatus connectable to a telecommunications network supporting mobile terminals;

wherein execution of the logic instructions on the data processing apparatus causes the data processing apparatus to carry out the following acts:

sending, in the telecommunications network to a mobile terminal of a user of a message service, a text-form message, wherein the text-form message relates to a session and a current stage of the session, wherein the sending comprises altering a sender address of the text-form message based on the current stage of the session; and receiving, at the altered sender address or at an address contained in the sent text-form message, a reply message from the mobile terminal, wherein the session proceeds based on contents of the reply message;

wherein in at least one stage of the session the reply message contains or relates to a voice message and the session proceeds based on contents of the voice message.]

[20. The apparatus of claim 18, further comprising means for repeating the sending and receiving for at least one subsequent current sage, wherein said repeating comprises altering the sender address of the text-form message based on at least one subsequent current stage and sending the text-form message with the altered sender address.]

[21. The telecommunication apparatus of claim 18, wherein the telecommunication apparatus is further configured to authenticate the mobile terminal based on said receiving the reply message at the altered sender address or at an address contained in the sent text-form message.]

[22. The telecommunication apparatus of claim 18, wherein the text-form message comprises a Short Message Service ["SMS"] message.]

[23. The telecommunication apparatus of claim 18, wherein the text-form message comprises a Multimedia Message Service ["MMS"] message.]

[24. The telecommunication apparatus of claim 18, wherein the text-form message comprises an e-mail message.]

[25. The telecommunication apparatus of claim 18, wherein said sending means are configured to alter the sender address of the text-form message to an address operative in the mobile terminal's home network or country.]

[26. The telecommunication apparatus of claim 18, wherein each of the sender addresses comprises an Internet Protocol Address.]

[27. The telecommunication apparatus of claim 18, wherein the telecommunication apparatus comprises an SMS bulk-delivery system.]

*28. A method comprising:*

*sending, in a telecommunications system, a text-form message to a user's mobile terminal by a telecommunications apparatus, wherein the text-form message relates to a communication session involving the mobile terminal, wherein the sending comprises altering a sender address of the text-form message based on the current stage of the session by selecting a sender address of the text-form message from a plurality of addresses currently available; and*

*the telecommunications apparatus receiving, at the altered sender address or at an address contained in the sent text-form message, a reply message from the mobile terminal, wherein the communication session proceeds based on contents of the received reply message,*

*wherein the reply message is a service order message, which is associated with at least one order for a supplementary service that is subject to payment,*

*wherein the telecommunication apparatus initiates delivery of the supplementary service over a communications channel that is not used to send or receive the text-form messages,*

*wherein the text-form message also relates to a current stage of the communication session; and*

*wherein the selection of the sender address is based on the current stage of the session, and*

*wherein in at least one stage of the session, the reply message contains or relates to a voice message and the session proceeds based on contents of the voice message.*

*29. The method of claim 28, further comprising authenticating the mobile terminal based on the reply message received at the selected sender address or at an address contained in the sent text-form message.*

*30. A method comprising:*

*sending, in a telecommunications system, a text-form message to a user's mobile terminal by a telecommunications apparatus, wherein the text-form message relates to a communication session involving the mobile terminal and a current stage of the session, wherein the sending comprises altering a sender address of the text-form message based on the current stage of the session by selecting a sender address of the text-form message from a plurality of addresses currently available; and*

*the telecommunications apparatus receiving, at the selected sender address or at an address contained in the sent text-form message, a reply message from the mobile terminal, wherein the communication session proceeds based on contents of the received reply message,*

*wherein the reply message is a service order message, which is associated with at least one order for a supplementary service that is subject to payment,*

*wherein the telecommunication apparatus initiates delivery of the supplementary service over a communications channel that is not used to send or receive the text-form messages,*

*the method further comprising repeating the sending and receiving of the text-form message for at least one subsequent current stage, wherein the repeating comprises selecting the sender address of the text-form message from a plurality of addresses currently available based on at least one subsequent current stage and sending the text-form message with the selected sender address,*

*wherein in at least one stage of the session, the reply message contains or relates to a voice message and the session proceeds based on contents of the voice message.*

*31. The method of claim 28, wherein the text-form message comprises a Short Message Service message.*

*32. The method of claim 28, wherein the text-form message comprises a Multimedia Message Service message.*

*33. The method of claim 28, wherein the text-form message comprises an electronic-mail message.*

*34. The method of claim 28, wherein each of the available sender addresses comprises an Internet Protocol Address.*

*35. The method of claim 30, further comprising authenticating the mobile terminal based on the reply message received at the selected sender address or at an address contained in the sent text-form message.*

*36. A telecommunication apparatus comprising:*

*a data processor for executing logic instructions;*

*a set of interfaces to at least one telecommunications system coupled to a plurality of mobile terminals including a user's mobile terminal;*

*a message sending logic for sending, in the at least one telecommunications system, a text-form message to the user's mobile terminal from the telecommunications apparatus, wherein the text-form message relates to a communication session involving the user's mobile terminal and a current stage of the session; and*

*a sending address converter for converting a sender address in the at least one message to at least one of the plurality of mobile terminals by selecting a sender address of the text-form message from a plurality of addresses currently available,*

*wherein the telecommunication apparatus further comprises a set of logic instructions whose execution on the data processor causes the data processor to send, in the telecommunications network to a mobile terminal of a user of a message service, a text-form message, wherein the text-form message relates to a session and a current stage of the session, wherein the sending comprises altering a sender address of the text-form message based on the current stage of the session,*

*wherein a reply message from the mobile terminal is received at the altered sender address or at an address contained in the sent text-form message,*

*wherein the data processor includes reply message reception logic for receiving at least one reply message from the at least one of the plurality of mobile terminals, wherein the reply message reception logic receives, at the selected sender address or at the address contained in the sent text-form message, a reply message from the user's mobile terminal,*

*wherein the communication session proceeds based on contents of the received reply message,*

*wherein, in at least one stage of the session, the reply message contains or relates to a voice message and the session proceeds based on contents of the voice message,*

*wherein the reply message is a service order message, which is associated with at least one order for a supplementary service that is subject to payment,*

*wherein the telecommunication apparatus initiates delivery of the supplementary service over a communications channel that is not used to send or receive the text-form messages,*

*wherein the text-form message also relates to a current stage of the communication session, and*

*wherein the selection of the sender address is based on the current stage of the session.*

*37. The telecommunication apparatus of claim 36, wherein the data processor authenticates the user's mobile terminal based on the reply message received at the selected sender address or at an address contained in the sent text-form message.*

*38. The telecommunication apparatus of claim 36, wherein the text-form message comprises a Short Message Service message.*

*39. The telecommunication apparatus of claim 36, wherein the text-form message comprises a Multimedia Message Service message.*

*40. The telecommunication apparatus of claim 36, wherein the text-form message comprises an electronic-mail message.*

*41. The telecommunication apparatus of claim 36, wherein each of the available sender addresses comprises an Internet Protocol Address.*

*42. A telecommunication apparatus comprising:*

*a data processor for executing logic instructions;*

*a set of interfaces to at least one telecommunications system coupled to a plurality of mobile terminals including a user's mobile terminal;*

*a message sending logic for sending, in the at least one telecommunications system, a text-form message to the user's mobile terminal from the telecommunications apparatus, wherein the text-form message relates to a communication session involving the user's mobile terminal and a current stage of the session;*

*a reply message reception logic for receiving at least one reply message to the at least one of the mobile terminals; and*

*a sending address converter for converting a sender address in the at least one message to at least one of the mobile terminals by selecting a sender address of the text-form message from a plurality of addresses currently available,*

*wherein the telecommunication apparatus further comprises a set of logic instructions whose execution on the data processor causes the data processor to send, in the telecommunications network to a mobile terminal of a user of a message service, a text-form message, wherein the text-form message relates to a session and a current stage of the session, wherein the sending comprises altering a sender address of the text-form message based on the current stage of the session,*

*wherein the telecommunication apparatus further comprises a set of logic instructions whose execution on the data processor causes the data processor to receive, at the altered sender address or at an address contained in the sent text-form message, a reply message from the mobile terminal,*

*wherein the data processor receives, at the selected sender address or at the address contained in the sent text-form message, a reply message from the user's mobile terminal,*

*wherein the communication session proceeds based on contents of the received reply message,*

*wherein, in at least one stage of the session, the reply message contains or relates to a voice message and the session proceeds based on contents of the voice message,*

*wherein the reply message is a service order message, which is associated with at least one order for a supplementary service that is subject to payment, and*

*wherein the telecommunication apparatus initiates delivery of the supplementary service over a communications channel that is not used to send or receive the text-form messages,*

*wherein the telecommunication apparatus repeats the sending and receiving of the text-form message for at least one subsequent current stage, wherein the repeating comprises selection of the sender address of the text-form message from a plurality of addresses currently available based on at least one subsequent current stage and sending the text-form message with the selected sender address.*

*43. The telecommunication apparatus of claim 42, wherein the data processor authenticates the user's mobile terminal based on the reply message received at the selected sender address or at an address contained in the sent text-form message.*

* * * * *